Patented Aug. 25, 1936

2,051,806

UNITED STATES PATENT OFFICE 2,051,806

PRODUCTION OF MERCAPTANS

Clyve Charles Allen, Berkeley, Calif., assignor to Shell Development Company, San Francisco, Calif., a corporation of Delaware No Drawing. Application March 18, 1935, Serial No. 11,679

23 Claims. (Cl. 260—156)

This invention relates to a novel process for the production of mercaptans which comprises reacting organic sulphur compounds containing at least one divalent thio or polythio radical, the loose bonds of which may be linked to the same or two different carbon atoms, with hydrogen sulphide at an elevated temperature and a pressure substantially greater than atmospheric.

An object of this invention is to provide a practical and economical method for the technical-scale production of mercaptans, which mercaptans have a wide variety of uses for which the organic sulphur compounds contemplated for treatment are unsuitable. Another object of this invention is to provide a process for the manufacture of mercaptans from organic sulphur compounds of the type herein described, particularly the thio-ethers and organic polysulphides, and hydrogen sulphide, which reactants may be, severally or in combination, contained in or derived from petroleum and/or petroleum products. A further object of the invention is to provide a process for the removal of organic sulphur compounds of the type herein described from petroleum and/or petroleum products such as pressure distillates, gasoline, kerosene and the like; said removal comprising converting the difficulty removable organic sulphur compounds into mercaptans which may be readily removed from the medium containing them by extraction therefrom with some suitable and economically employed solvent such as liquid ammonia, strong mineral oxy-acids and the like.

The organic sulphur compounds which may be converted to mercaptans in accordance with the principles of my invention are characterized by possessing at least one divalent radical of the type —$S_x$— wherein $x$ represents an integer equal to one or more but generally not greater than five and wherein the loose bonds of the radical are linked to the same carbon atom or each bond is linked to a different carbon atom. The —$S_x$— radical may comprise part of a normal or iso chain which may or may not be linked to a cyclic radical of the carbocyclic and heterocyclic series, or the radical —$S_x$— may comprise part of a cyclic structure.

To aid in the presentation of the principles of my invention in a clear and understandable manner, the various species of organic sulphur compounds contemplated may be classified into two groups. The groups may be considered to embrace: (1) those organic sulphur compounds comprising the structure

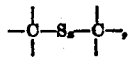

and (2) those compounds comprising the structure

The first group includes such compounds as the monosulphides or thio-ethers, the polysulfides, mercaptals, mercaptols and those heterocyclic compounds such as the thiophenes, thionaphthenes, dibenzothiophenes, dinaphthothiophenes, and the like, while the second group includes compounds such as the thioaldehydes, polymeric thioaldehydes, thioacetals, thioketones, thionic acids, thionic acid esters, dithionic acids, dithionic esters and the like.

The organic mono- and polysulfides are conveniently represented by the formula R—$S_x$—R' wherein R and R' may be the same or different organic radicals of aliphatic, aralkyl or cyclic character which may or may not be further substituted, and which may be attached to the —$S_x$— radical by a primary, secondary or tertiary carbon. For example R and R' may be radicals such as methyl, ethyl, propyl, isopropyl, butyl, isobutyl, secondary butyl, tertiary butyl, amyl, isoamyl, secondary and tertiary amyl, benzyl, phenylethyl, diphenyl-ethyl, phenyl-propyl, naphthylethyl, naphthyl-propyl, phenyl, naphthyl, cyclobutyl, cyclopentyl, cyclo-hexyl and the like and their homologues, analogues and suitable substitution products. The simplest organic sulphides are the thio-ethers which may be represented by the formula R—$S_x$—R' wherein $x$ is equal to one, that is, the radical —$S_x$— becomes the thio radical —S—.

In the execution of my invention for the purpose of manufacturing mercaptans, the source of the organic sulphur compounds to be treated is immaterial. The same may be prepared by any of the conventional methods or recovered from any raw material such as petroleum and petroleum products containing them severally or in combination.

I may utilize the sulphur compounds to be treated severally or in combination, in a pure state or in admixture with relatively unreactive substances. Suitable organic sulphur compounds may be dissolved or suspended in an inert medium such as a hydrocarbon or mixtures thereof such as oils, gasoline, kerosene, as well as other inert substances such as halogenated hydrocarbons and the like.

The hydrogen sulphide may be utilized in a pure or substantially pure state or in admixture with relatively unreactive substances such as hydrocarbons, nitrogen, carbon dioxide and the like. Refinery, smelting and other industrial gases containing hydrogen sulphide may be conveniently employed or such mixtures may be treated and the hydrogen sulphide recovered therefrom in the desired degree of purity.

My invention is preferably executed under anhydrous or substantially anhydrous conditions. Prior to effecting reaction, the reactants or a suitable mixture or mixtures containing them may be rendered substantially anhydrous by resorting to any of the suitable drying operations known to the art. The reaction appears to be accelerated when effected in the absence of even traces of water present as water per se; accordingly, the process is advantageously executed in the presence of a suitable water-binding agent. A suitable water-binding agent for the present purpose is a substance capable of existing as a fluid or in solution in the reaction mixture, and of reacting with traces of water and retaining said water in combination under the conditions of operation without inducing the substantial occurrence of condensation and polymerization reactions and without exercising a substantial detrimental influence on the activity of the catalyst, if a catalyst is employed, or otherwise on the rate and extent of occurrence of the reaction. A group of suitable, and preferably employed water-binding agents includes the carboxylic acid anhydrides, for example, the anhydrides of acids such as acetic, propionic, butyric, isobutyric, valeric, isovaleric, caproic, crotonic, maleic, malonic, succinic, benzoic, cinnamic, and the like as well as their homologues, analogues, and suitable substitution products.

The water-binding agents may be employed severally or in combination. The quantity of the selected agent or mixture of agents to be employed will depend on the specific agent or agents employed and on the amount of water present in the reacted mixture.

I have found that my invention may be advantageously executed either in the absence of or in the presence of a catalyst for the reaction. However, since the rate of reaction is generally accelerated by the presence of a metal or metal compound capable of exerting a catalytic influence, I generally prefer to employ such a catalyst. A suitable catalyst may be an element, alloy or compound of a metal or element capable of acting as a catalyst in accordance with the conditions of execution of my invention. Particularly suitable catalysts are the metal sulphides. Suitable metal sulphide catalysts which may be employed per se or formed during the course of the reaction by the interaction of suitable substances introduced into the reaction zone or by reaction of an introduced metal or metal compound with an excess of one of the reactants or reaction products are the sulphides of the metals such as calcium, beryllium, zinc, magnesium, strontium, barium, sodium, potassium, aluminum, chromium, zirconium, tin, copper, thallium, vanadium, molybdenum, tungsten, arsenic, antimony, ruthenium, rhodium, palladium, osmium, irridium, platinum, nickel, iron, cobalt and others. The sulphides of the metals of the iron subgroup of the periodic table which includes nickel, iron and cobalt are particularly suitable catalysts due to their initial catalytic activity, stability and resistance against poisoning and subsequent loss of activity and also due to the fact that their presence does not favor the substantial occurrence of undesirable condensation and polymerization reactions. In addition, active sulphides of the metals of the iron subgroup may be readily prepared from relatively inexpensive materials.

The catalysts may be used severally or in combination. The particular catalyst or catalyst mixture selected may be prepared in an active state in a wide variety of ways known to the art. The metals per se as well as suitable compounds thereof such as the oxides, hydroxides, etc., may be treated with hydrogen sulphide and/or other suitable sulphidizing agents under favorable conditions. Another suitable mode of preparation of active metal sulphides comprises effecting the thermal decomposition of metal thio-salts.

The catalytic material may be employed as a finely divided powder, as granules, pellets and the like, or in any other suitable form. The specific form in which the catalytic material is to be employed will be dependent on its specific activity, the state and nature of the materials reacted, the reaction conditions and the particular choice of the operator. In some cases, it may be desirable to precipitate or otherwise deposit the catalyst upon an inert substance or carrier such as pumice, silica gel, keiselguhr, clay, charcoal and the like substances or mixtures thereof.

In many cases and particularly when metal reaction vessels are employed, it may be desirable to coat the interior surface of the reaction vessel with a thin layer or film of an active metal sulphide. When a metal reaction vessel is employed, said vessel may be coated with an active metal sulphide corresponding to the metal of the interior of the vessel by contacting the cleaned interior surface of the vessel with hydrogen sulphide or solution of a soluble metal hydrosulphide, sulphide or polysulfide, under conditions favoring the formation of the active sulphide film, prior to utilization of the reaction vessel.

The present invention may be advantageously executed in either the gaseous or the liquid phase. The phase in which the reaction is most economically effected will, in the majority of cases, be dependent on the critical temperature and pressure of the reaction mixture as compared with the desired temperature and pressure of operation. When treating the lower boiling organic sulphur compounds, it may be desirable to effect the reaction in the gaseous phase since the critical temperature of the reaction mixture may be below the temperature required to effect reaction at an economical rate. With the higher boiling organic sulphur compounds, liquid as well as vapor phase methods of operation may be advantageously resorted to.

In general, my invention may be executed in closed vessels with the contents thereof under the total vapor pressure of the constituents at the temperature of operation. In such cases, the pressure employed will be dependent upon the reaction temperature. Moderate rather than excessively high pressures are generally preferable since excessively high pressures not only favor condensation and/or polymerization of reactants and products, but also when above a certain optimum their use may be uneconomical in that costly high-pressure equipment is necessitated. In the majority of cases, my invention may be advantageously executed at pressures greater than atmospheric, but not generally exceeding about 4000 lbs. per sq. in., although higher pressures may be used when necessary or desirable.

The temperature of execution of the invention is generally dependent upon whether a liquid or gas phase reaction is desired, upon the activity and thermal stability of the catalyst employed, upon the thermal stability of the reactants and reaction products and upon the desired contact time of the reactants. The pressure and contact time may be adjusted and a suitable catalyst selected so that satisfactory yields of the desired product may be obtained over a wide range of temperatures. A generally desirable temperature range is from about 35° C. to about 500° C. but higher or lower temperatures may be resorted to in some cases. A preferred temperature range is from about 100° C. to about 300° C. In general, the higher temperatures favor the reaction to form mercaptan; however, the higher temperatures also favor pyrolysis and condensation of the reactants and products and may detrimentally influence the stability and activity of the catalyst employed. Within certain temperature limits, the stability of the catalyst, when a metal sulphide catalyst is employed, determines in conjunction with the stability of the organic sulphur compound treated the optimum reaction temperature. For example, ferric and ferrous sulphides suffer decomposition and impairment of catalytic activity at temperatures as low as 190° C., while the nickel sulphides may be advantageously employed at temperatures up to about 300° C.

I prefer to execute my invention at temperatures at which substantial pyrolysis of the treated compound is avoided. It is known that organic polysulfides, when treated at sufficiently high temperatures, polymerize to yield a mixture of sulphur compounds and polymers thereof among which mercaptans have been identified. The execution of my invention is dependent on the chemical reaction of organic sulphur compounds as herein described with hydrogen sulphide, and consequently pyrolysis is avoided. Further, as is the case when an organic polysulphide, for example, a disulphide, is treated by my method, the hydrogen sulphide also acts as a reducing agent as indicated by the following reaction whereby two molecules of mercaptan and elemental sulphur result:

$$R-S_2-R' + H_2S \rightarrow RSH + R'SH + S.$$

Organic mono- and polysulfides will, in accordance with the principles of my invention, react with hydrogen sulphide to produce excellent yields of the corresponding mercaptans at temperatures too low to effect any pyrolysis of the organic sulphide in the absence of hydrogen sulphide.

My process may be conducted with excellent results in a batch, intermittent or continuous manner. In a batch or intermittent mode of operation, the reactants per se or in admixture with each other and/or suitable unreactive substances may be charged to a suitable reaction vessel such as a tubular reactor or autoclave. A suitable water-binding agent such as acetic anhydride and a suitable catalyst may, if desired, be added to the gaseous, liquid or two fluid phase reaction mixture. The autoclave or reactor is then closed and the mixture heated to the desired temperature under a pressure greater than atmospheric for a time necessary to effect the desired extent of reaction. In some cases, agitation of the reaction mixture may be advantageous. It will be seen that when gas phase reaction is effected, agitation may be unnecessary; however, when a catalyst is employed it may be desirable to present the maximum of catalytic surface by stirring or other suitable means. When the reaction has proceeded to the desired extent, the cooled mixture may be discharged from the reaction chamber and the reaction product or products separated from each other and/or the unreacted reactants by any suitable means such as fractionation, condensation, extraction and the like. The unreacted reactants may be reutilized in the same or another reaction unit.

A suitable procedure adaptable to batch, intermittent or continuous modes of operation comprises passing the reactants in contact with each other, in a gaseous or liquid phase and at a pressure substantially greater than atmospheric, over a stationary bed of catalytic material maintained at the desired temperature. The reacted mixture may be condensed and the reaction product or products and the unreacted reactants separated by any suitable means. The unreacted reactants may be reutilized in the same or another suitable reaction unit.

As an alternative mode of operation, the reactants, severally or in combination, may be continually fed at the desired rate into a reaction vessel maintained at a suitable reaction temperature. During the course of the reaction, the pressure in the reaction vessel may be maintained substantially above atmospheric by regulating the admission of the reactants, mixtures thereof or a thermally responsive inert fluid and by regulation of the rate of withdrawal of the reacted material. The reacted material may be continuously or intermittently withdrawn from the reactor in a liquid state. If desired, such a reaction unit may be in communication with a separation or purification stage wherein the withdrawn reacted material may be purified and/or separated if more than one product is present. Other modes of operation, which may be apparent to those skilled in the art, may be employed in the execution of my invention without departing from the principles inherent in the same.

The reactants may be present in the reaction chamber in the stoichiometrical amounts or with either of the reactants in excess.

For illustrative purposes, reference is had to several specific examples which typify suitable methods of executing my invention.

*Example I*

A steel autoclave was charged with a mixture containing about 50 gm. of di-normal butyl sulphide, 2 gm. of acetic anhydride and about 30 gm. of hydrogen sulphide. The autoclave was closed and the contents thereof were heated at about 180° C. for about 4.5 hours. At the end of this time, the autoclave was cooled and its contents removed, warmed to remove unreacted hydrogen sulphide therefrom and washed free of acetic anhydride. The remaining liquid residue of about 55.5 gm. consisted of 8.0 gm. of butyl mercaptan, 46 gm. of dibutyl sulphide and about 1.5 gm. of unidentified material.

These results obtained indicate that 12.9% of the di-normal butyl sulphide and 5% of the hydrogen sulphide applied was converted to normal butyl mercaptan.

Example II

A steel autoclave, the interior surface of which was cleaned and polished, was charged with a mixture of about 35 gm. of di-tertiary butyl sulphide and 30 gm. of hydrogen sulphide. This mixture was heated under the combined vapor pressure of the constituents at about 180° C. for about 12 hours. At the end of this time, the autoclave was cooled and the reacted mixture discharged therefrom and fractionated. About 12 gm. of tertiary butyl mercaptan, boiling in the temperature range of from about 63° C. to 65.5° C. at atmospheric pressure, were obtained.

The amount of tertiary butyl mercaptan obtained represented a 27.8% conversion calculated on the applied di-tertiary butyl sulphide and a 7.7% conversion on the applied hydrogen sulphide.

Example III

The steel autoclave employed in the previous examples was coated with a film of active iron sulphide by the following mode of treatment. The cleaned and polished interior surface of the autoclave was contacted at 180° C. for about 6 hours with a concentrated solution of sodium hydrosulphide in an 80% aqueous alcohol solution.

Following the above treatment, the autoclave was charged with a mixture consisting of about 56.6 gm. of di-tertiary butyl sulphide, 3.5 gm. of diisobutylene, 2 gm. of acetic anhydride and about 30 gm. of hydrogen sulphide. The contents of the autoclave were heated to and maintained at a temperature of about 190° C. for about 4.5 hours with the reaction mixture under the total vapor pressure of the constituents. At the end of this time, the autoclave was cooled and its contents discharged and analyzed.

The reaction mixture contained:

| | Grams |
|---|---|
| Hydrogen sulphide | 19.5 |
| Di-tertiary butyl sulphide | 10.5 |
| Acetic anhydride | 2.0 |
| Diisobutylene | 3.5 |
| Tertiary butyl mercaptan | 51.0 |
| Mixed butyl mercaptans | 3.0 |

About 2.5 gm. of the original material could not be accounted for.

These results show that 81.4% of the applied di-tertiary butyl sulphide reacted. Of the organic sulphide reacted, 89.5% was converted to tertiary butyl mercaptan, while the remaining 10.5% was partly converted to other butyl mercaptans and partly polymerized.

The results of this example illustrate the advantages of effecting the reaction in the presence of an active metal sulphide catalyst. With the exception of a 10° C. increase in temperature and the presence of an active iron sulphide catalyst, the conditions of this example are the same as employed in Example I, wherein only 12.9% of the applied di-tertiary butyl sulphide reacted.

Example IV

This run was made in a steel autoclave possessing a nickel plated interior surface. Prior to introduction of the reactants, a coat of active nickel sulphide was deposited on the interior surface of the autoclave by contact with a saturated sodium sulphide solution at 180° C. for about six hours. Following the above treatment, the autoclave was charged with a mixture consisting of about 60% of the monomer and 40% of the trimer of methyl ethyl thio-ketone

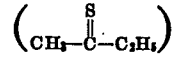

10 gm. of acetic anhydride and 172 gm. of hydrogen sulphide. This mixture was heated at about 200° C. for about 3 hours at a pressure equal to the combined vapor pressures of the constituents. At the end of this time, the autoclave was cooled and its contents discharge and fractionated.

The fractionation yielded 43 gm. of secondary butyl mercaptan. This represents a conversion of 17.5% of the organic sulphur compounds and a 9.5% conversion of the applied hydrogen sulphide.

Example V

A steel autoclave, the interior surface of which was previously coated with an active iron sulphide, was charged with a mixture consisting of about 17 gm. of methyl phenyl sulphide, 1 gm. of acetic anhydride and about 45 gm. of hydrogen sulphide. The reaction mixture was kept at a temperature of about 170° C., under the vapor pressure of the constituents, for about 4.5 hours. At the end of this time, the reacted mixture was cooled, discharged from the autoclave and analyzed. After removal of the unreacted hydrogen sulphide, the liquid residue consisted of methyl mercaptan, thiophenol and unreacted methyl phenyl sulphide.

The results of the analysis indicated that 13.1% of the methyl phenyl sulphide and 1.3% of the hydrogen sulphide had reacted to form mercaptans.

Example VI

A steel autoclave, the interior surface of which had been previously coated with a film of active iron sulphide, was charged with about 64 gm. of ethyl disulphide. The contents of the autoclave were heated at about 170° C. for about 15 hours. At the end of this time, the autoclave was cooled and its contents discharged and analyzed. The analysis showed that no hydrogen sulphide, mercaptans or thio-ethers were formed during the above treatment. The absence of thio-ethers in particular was verified by fractionation of the liquid subsequent to treatment. No distillate was obtained at temperatures below 150° C., while di-ethyl sulphide boils at about 92° C. under atmospheric pressure.

The same autoclave was charged with a mixture consisting of 35 gm. of ethyl disulphide, 1 gm. of acetic anhydride and about 30 gm. of hydrogen sulphide. This mixture was heated at a temperature of about 170° C. for about 15 hours with the reaction mixture under the combined vapor pressure of its constituents. At the end of this time, the autoclave was cooled and its contents discharged therefrom and analyzed. 10.7 gm. of ethyl mercaptan were formed. This represents a 30% conversion of the ethyl disulphide, assuming that one mol of ethyl disulphide reacts with hydrogen sulphide to yield two mols of ethyl mercaptans.

This example is illustrative of the fact that, in accordance with the principles of my invention, hydrogen sulphides may be reacted with an organic polysulphide under conditions at which appreciable pyrolysis of the polysulphide cannot occur. This example appears to establish my belief that the hydrogen reacts directly with the polysulphide and not by a mechanism such as the following, which involves preliminary thio-ether formation as follows:

$$2R_2S_2 = R_2S + R_2S_3$$
$$R_2S + H_2S = 2RSH$$

Example VII

A steel autoclave, the interior surface of which was previously coated with a film of active iron sulphide, was charged with a mixture consisting of about 54 gm. of di-tertiary butyl sulphide, 2 gm. of propionic acid anhydride and about 30 gm. of hydrogen sulphide. This mixture was heated at a temperature of about 190° C. for about 4.5 hours with the mixture under the total vapor pressure of the constituents. At the end of this time the autoclave was cooled and its contents discharged therefrom and analyzed. After removal of the unreacted hydrogen sulphide, the liquid residue consisted of about 10.5 gm. of unreacted di-tertiary butyl sulphide and about 51.0 gm. of tertiary butyl mercaptan. About 58.7% of the applied di-tertiary butyl sulphide was converted to tertiary butyl mercaptan.

The mercaptans obtained by my process may be used severally or in combination for a wide variety of purposes. The mercaptans per se or mixtures containing them are useful as pickling inhibitors. One of the chief disadvantages connected with the use of acids or acid liquors in processes conducted in metal apparatus resides in the destructive action of the acid on the metal. Mercaptans act as inhibitors of the solvent action of acids on metals. In this connection, mercaptans may be useful as constituents of oil-well cleaning compositions. Mercaptans are valuable intermediates in the preparation of a wide variety of useful sulphur-containing organic compounds. For example, they are useful as intermediates in the preparation of dyes of the anthraquinone series, thio-indigoes and indamines. When heated with phosphorous tri- and/or penta-sulphides, mercaptans yield liquids useful in ore flotation processes. Mercaptans and mixtures containing them are useful as fly-repellants and insecticides. In many cases, mercaptans act as stabilizing agents for chlorinated hydrocarbons. The butyl mercaptans are particularly suitable as stabilizers for carbon tetrachloride and ethylene chloride.

While I have in the foregoing described in some detail the preferred embodiment of my invention and some variants thereof, it will be understood that this is only for the purpose of making the invention more clear and that the same is not to be regarded as limited to the details of operation described, nor is it dependent upon the soundness or accuracy of the theories advanced as to the advantageous results obtained. On the other hand, the invention is to be regarded as limited only by the terms of the accompanying claims, in which it is our intention to claim all novelty inherent therein as broadly as is possible in view of the prior art.

I claim as my invention:

1. A process for the production of a mercaptan which comprises reacting an organic sulphur compound of the class consisting of those possessing the radical $$-\overset{|}{C}=S$$

linked to at least one hydrocarbon radical and those possessing the radical —$S_x$—, wherein $x$ represents an integer not greater than five, linked to at least one hydrocarbon radical with hydrogen sulphide at a superatmospheric pressure and a temperature materially above room temperature but below the temperature at which substantial pyrolysis of the organic reactant occurs.

2. A process for the production of a mercaptan which comprises reacting an organic sulphur compound of the class consisting of those possessing the radical $$-\overset{|}{C}=S$$

linked to at least one hydrocarbon radical and those possessing the radical —$S_x$—, wherein $x$ represents an integer not greater than five, linked to at least one hydrocarbon radical with hydrogen sulphide in the presence of a metal sulphide catalyst at a superatmospheric pressure and a temperature greater than about 35° C. but below the temperature at which substantial pyrolysis of the organic reactant occurs.

3. A process for the production of a mercaptan which comprises reacting an organic sulphur compound of the class consisting of those possessing the radical $$-\overset{|}{C}=S$$

linked to at least one hydrocarbon radical and those possessing the radical —$S_x$—, wherein $x$ represents an integer not greater than five, linked to at least one hydrocarbon radical with hydrogen sulphide in the presence of a metal sulphide catalyst under anhydrous conditions at a superatmospheric pressure and a temperature greater than about 35° C. but below the temperature at which substantial pyrolysis of the organic reactant occurs.

4. A process for the production of a mercaptan which comprises reacting an organic sulphur compound of the class consisting of those possessing the radical $$-\overset{|}{C}=S$$

linked to at least one hydrocarbon radical and those possessing the radical —$S_x$—, wherein $x$ represents an integer not greater than five, linked to at least one hydrocarbon radical with hydrogen sulphide in the presence of a carboxylic acid anhydride and a metal sulphide catalyst at a superatmospheric pressure and a temperature greater than about 35° C. but below the temperature at which substantial pyrolysis of the organic reactant occurs.

5. A process for the production of a mercaptan which comprises reacting an organic sulphur compound of the class consisting of those possessing the radical $$-\overset{|}{C}=S$$

linked to at least one hydrocarbon radical and those possessing the radical —$S_x$—, wherein $x$ represents an integer not greater than five, linked to at least one hydrocarbon radical with hydrogen sulphide in the presence of a catalyst of the class consisting of nickel, iron and cobalt sulphides at a superatmospheric pressure and a temperature of from about 100° C. to about 300° C.

6. A process for the production of a mercaptan which comprises reacting an organic sulphur compound containing the radical $$-\overset{|}{C}=S$$

linked to at least one hydrocarbon radical with hydrogen sulphide at a superatmospheric pressure and a temperature materially above room temperature but below the temperature at which substantial pyrolysis of the organic reactant occurs.

7. A process for the production of a mercaptan which comprises reacting an organic sulphur compound containing the radical —S$_x$—, wherein $x$ represents an integer not greater than five, linked to at least one hydrocarbon radical with hydrogen sulphide at a superatmospheric pressure and a temperature materially above room temperature but below the temperature at which substantial pyrolysis of the organic reactant occurs.

8. A process for the production of a mercaptan which comprises reacting an organic sulphur compound containing the radical —S$_x$—, wherein $x$ represents an integer not greater than five, linked to at least one hydrocarbon radical with hydrogen sulphide in the presence of a carboxylic acid anhydride and a metal sulphide catalyst at a superatmospheric pressure and a temperature greater than about 35° C. but below the temperature at which substantial pyrolysis of the organic reactant occurs.

9. A process for the production of a mercaptan which comprises reacting an organic sulphur compound containing the radical —S$_x$—, wherein $x$ represents an integer not greater than five, linked to at least one hydrocarbon radical with hydrogen sulphide in the presence of a catalyst of the class consisting of nickel, iron and cobalt sulphides at a superatmospheric pressure and a temperature of from about 100° C. to about 300° C.

10. A process for the production of a mercaptan which comprises reacting an organic sulphur compound of the general formula R—S$_x$—R', wherein R and R' may be the same or different and represent hydrocarbon radicals and $x$ represents an integer not greater than five, with hydrogen sulphide in the presence of a catalyst of the class consisting of nickel, iron and cobalt sulphides at a superatmospheric pressure and a temperature of from about 100° C. to about 300° C.

11. A process for the production of a mercaptan which comprises reacting an organic sulphur compound of the general formula R—S$_x$—R', wherein R and R' may be the same or different and represent hydrocarbon radicals and $x$ represents an integer not greater than five, with hydrogen sulphide in the presence of acetic anhydride and a catalyst of the class consisting of nickel, iron and cobalt sulphides at a superatmospheric pressure and a temperature of from about 100° C. to about 300° C.

12. A process for the production of a mercaptan which comprises reacting an organic sulphur compound of the general formula R—S$_x$—R', wherein R and R' may be the same or different and represent hydrocarbon radicals and $x$ represents an integer not greater than two, with hydrogen sulphide in the presence of a carboxylic acid anhydride and a catalyst of the class consisting of nickel, iron and cobalt sulphides at a superatmospheric pressure and a temperature of from about 100° C. to about 300° C.

13. A process for the production of a mercaptan which comprises reacting an organic sulphur compound of the general formula R—S$_x$—R', wherein R and R' may be the same or different and represent hydrocarbon radicals and $x$ represents an integer not greater than two, with hydrogen sulphide in the presence of acetic anhydride and a nickel sulphide catalyst at a superatmospheric pressure and a temperature of from about 100° C. to about 300° C.

14. A process for the production of a mercaptan which comprises reacting an organic disulphide with hydrogen sulphide in the presence of a catalyst of the class consisting of nickel, iron and cobalt sulphides at a superatmospheric pressure and a temperature materially above room temperature but below the temperature at which substantial pyrolysis of the organic disulphide occurs.

15. A process for the production of a mercaptan which comprises reacting an organic disulphide with hydrogen sulphide in the presence of acetic anhydride and a catalyst of the class consisting of nickel, iron and cobalt sulphides at a superatmospheric pressure and a temperature of from about 100° C. to about 300° C.

16. A process for the production of a mercaptan which comprises reacting a thio-ether with hydrogen sulphide in the presence of a catalyst of the class consisting of nickel, iron and cobalt sulphides at a superatmospheric pressure and a temperature materially above room temperature but below the temperature at which substantial pyrolysis of the thio-ether occurs.

17. A process for the production of a mercaptan which comprises reacting a thio-ether with hydrogen sulphide in the presence of acetic anhydride and a catalyst of the class consisting of nickel, iron and cobalt sulphides at a superatmospheric pressure and a temperature of from about 100° C. to about 300° C.

18. A process for the production of a mercaptan which comprises reacting an organic sulphur compound of the general formula

wherein R represents a hydrocarbon radical and R' represents H, OH or a hydrocarbon radical, with hydrogen sulphide in the presence of a catalyst of the class consisting of nickel, iron and cobalt sulphides at a superatmospheric pressure and a temperature materially above room temperature but below the temperature at which substantial pyrolysis of the thio-carboxylic compound occurs.

19. A process for the production of a mercaptan which comprises reacting an organic sulphur compound of the general formula

wherein R represents a hydrocarbon radical and R' represents H, OH or a hydrocarbon radical with hydrogen sulphide in the presence of acetic anydride and a catalyst of the class consisting of nickel, iron and cobalt sulphides at a superatmospheric pressure and a temperature of from about 100° C. to about 300° C.

20. A process for the production of tertiary butyl mercaptan which comprises reacting di-tertiary butyl sulphide with hydrogen sulphide in the presence of a carboxylic acid anhydride and a catalyst of the class consisting of nickel, iron and cobalt sulphides at a superatmospheric pressure and a temperature of about 190° C.

21. A process for the production of a mercaptan which comprises reacting an organic sulphur compound containing the radical

linked to at least one hydrocarbon radical with hydrogen sulphide at a superatmospheric pressure and a temperature materially above room temperature but below the temperature at which substantial pyrolysis of the organic reactant occurs.

22. A process for the production of a mercaptan which comprises reacting an organic sulphur compound of the general formula $$R-C=S$$
$$\phantom{R-C=}|$$
$$\phantom{R-C=}R'$$

wherein R represents a hydrocarbon radical and R' is a member of the group consisting of H, OH, SH, OR'', SR'' and hydrocarbon radicals, R'' representing a hydrocarbon radical, with hydrogen sulphide at a superatmospheric pressure at a temperature materially above room temperature but below the temperature at which substantial pyrolysis of the organic reactant occurs.

23. A process for the production of a mercaptan which comprises reacting an organic sulphur compound of the general formula $R-S_x-R'$, wherein R and R' may be the same or different and represent hydrocarbon radicals and $x$ represents an integer not greater than five, with hydrogen sulphide in the presence of a catalyst of the class consisting of nickel, iron and cobalt sulphides at a superatmospheric pressure and a temperature of from about 100° C. to about 300° C.

CLYVE CHARLES ALLEN.